(12) United States Patent
Moriya et al.

(10) Patent No.: US 7,850,557 B2
(45) Date of Patent: Dec. 14, 2010

(54) TORQUE FLUCTUATION DAMPER PULLEY

(75) Inventors: Masaoki Moriya, Kariya (JP); Yukinobu Nishiyama, Kariya (JP)

(73) Assignee: JTEKT Corporation, Osaka-shi (JP)

(*) Notice: Subject to any disclaimer, the term of this patent is extended or adjusted under 35 U.S.C. 154(b) by 856 days.

(21) Appl. No.: 11/434,178

(22) Filed: May 16, 2006

(65) Prior Publication Data
US 2006/0264282 A1    Nov. 23, 2006

(30) Foreign Application Priority Data
May 20, 2005   (JP)   ............... 2005-147616

(51) Int. Cl.
F16H 55/14   (2006.01)
F16F 15/12   (2006.01)

(52) U.S. Cl. .................. 474/94; 474/902; 464/90; 74/574.4

(58) Field of Classification Search .......... 474/94, 474/178; 74/574.4; 464/32, 33, 51, 83, 85, 464/90–91
See application file for complete search history.

(56) References Cited

U.S. PATENT DOCUMENTS

| | | | | |
|---|---|---|---|---|
| 2,204,953 A * | 6/1940 | Wittmer | ................ | 295/11 |
| 2,672,907 A * | 3/1954 | Maclean | ................ | 152/41 |
| 2,674,897 A * | 4/1954 | Heinish | ................ | 474/94 |
| 3,479,907 A * | 11/1969 | Hall | ................ | 74/574.4 |
| 3,504,509 A * | 4/1970 | Paulsen | ................ | 464/85 |
| 4,041,803 A * | 8/1977 | Goloff et al. | ................ | 74/574.4 |
| 4,378,865 A * | 4/1983 | McLean | ................ | 188/379 |
| 4,710,152 A * | 12/1987 | Ichikawa et al. | ................ | 474/166 |
| 5,452,622 A * | 9/1995 | Fenelon | ................ | 74/411 |
| 5,573,461 A * | 11/1996 | Colford | ................ | 464/83 |
| RE35,932 E * | 10/1998 | Cerny et al. | ................ | 474/135 |
| 5,988,015 A | 11/1999 | Riu | | |
| 6,332,842 B1 * | 12/2001 | Tabuchi et al. | ................ | 464/33 |
| 6,742,412 B2 * | 6/2004 | Feldhaus et al. | ................ | 74/574.2 |
| 7,025,680 B2 * | 4/2006 | Tabuchi et al. | ................ | 464/32 |
| 7,204,772 B2 * | 4/2007 | Huber | ................ | 474/94 |
| 2006/0172832 A1 * | 8/2006 | Watanabe et al. | ................ | 474/94 |

FOREIGN PATENT DOCUMENTS

| | | |
|---|---|---|
| EP | 0 462 356 A1 | 12/1991 |
| EP | 1 279 807 A1 | 1/2003 |
| GB | 2 374 654 A | 10/2002 |

(Continued)

*Primary Examiner*—Robert A Siconolfi
*Assistant Examiner*—Anna Momper
(74) *Attorney, Agent, or Firm*—Oblon, Spivak, McClelland, Maier & Neustadt, L.L.P.

(57) ABSTRACT

A torque fluctuation damper pulley 10 is provided with a torque fluctuation damping elastic member 15 between a hub 11 attached to a rotational shaft and a pulley member 13. The torque fluctuation damping elastic member 15 includes a pair of rubber members 15A and 15B which sandwich a support portion 24 of the pulley member 13 under equal elastic forces from the front and rear in the axial direction of the pulley member 13 to joint the hub with the pulley member 13 elastically. Thus, the pulley member 13 always has equal forces being applied thereto from the front and rear in the axial direction, so that it becomes possible to make unnecessary any thrust bearing which would otherwise be required for positioning the pulley member 13 in the axial direction.

14 Claims, 2 Drawing Sheets

FOREIGN PATENT DOCUMENTS

| | | |
|---|---|---|
| GB | 2374654 A * | 10/2002 |
| JP | 3-17460 | 2/1991 |
| JP | 4-231751 | 8/1992 |
| JP | 3155280 | 2/2001 |
| JP | 2001-159448 | 6/2001 |
| JP | 2003-343652 | 12/2003 |
| JP | 2004-144253 | 5/2004 |
| JP | 2004-278618 | 10/2004 |
| JP | 2004-278726 | 10/2004 |
| JP | 2004-316882 | 11/2004 |
| JP | 2004-340169 | 12/2004 |
| WO | WO 96/25611 | 8/1996 |

* cited by examiner

TORQUE FLUCTUATION DAMPER PULLEY

INCORPORATION BY REFERENCE

This application is based on and claims priority under 35 U.S.C. 119 with respect to Japanese Application No. 2005-147616 filed on May 20, 2005, the entire content of which is incorporated herein by reference.

BACKGROUND OF THE INVENTION

1. Field of the Invention

The present invention relates to a torque fluctuation damper pulley for transmitting the rotation from an engine of a motor car or the like to accessories while damping fluctuation in the rotation.

2. Discussion of the Related Art

A part of the driving power from an engine of a motor car is transmitted from a pulley attached to a shaft end of a crankshaft through an endless belt to accessories such as alternator and water pump for example. The crankshaft is rotated with rotation change (torque fluctuation) of the engine, and a pulley used therefor is generally provided with a torque fluctuation damper for damping the torque fluctuation.

As pulleys with a torque fluctuation damper of this kind, there has been known damper pulleys described in Japanese Unexamined, Published Patent Application No. 2001-159448 and Japanese Patent No. 3155280 (hereafter referred to as Related Art 1 and Related Art 2 respectively). These damper pulleys take the configuration that an inertia mass is jointed with the circumference of a hub, which is attached to the shaft end of a crankshaft to rotate bodily therewith, through a first rubber-like elastic member and that the hub and a pulley member are jointed with each other through a second rubber-like elastic member. Thus, the rotation is transmitted to the pulley member with the first rubber-like elastic member damping the vibrations in rotation transmitted from the crankshaft to the hub and at the same time, with the second rubber-like elastic member damping the fluctuation in rotational torque transmitted from the crankshaft to the hub through the sharing deformation thereof in a torsional direction.

However, in either of the forgoing torque fluctuation damper pulleys described in Related Art 1 and Related Art 2, it is probable that the deterioration or the like of the second rubber-like elastic member (16, 24) arranged between the pulley member and the hub causes the pulley member to shift in the axial direction at the time of being in use. Thus, a thrust bearing (20, 50) has to be provided to position the pulley member in the axial direction. This gives rise to problems that the cost rises due to an increase in the number of component parts of the damper pulley, the complication in construction and an increase in assembling steps.

SUMMARY OF THE INVENTION

It is therefore a primary object of the present invention to provide an improved torque fluctuation damper pulley which does not need any thrust bearing for positioning a pulley member in the axial direction.

Briefly, according to the present invention, there is provided a torque fluctuation damper pulley, which comprises a hub adapted to be attached to a rotational shaft; an inertia mass provided around the hub; a torsional elastic member jointing the inertia mass with the circumferential surface of the hub; a pulley member rotatable relative to the inertia mass; and a torque fluctuation damping elastic member elastically jointing the pulley member with the hub and including a pair of rubber members which makes the hub sandwich the pulley member under equal elastic forces from the front and rear in the axial direction.

With this configuration, the torque fluctuation damping elastic member makes the hub sandwich the pulley member through the pair of rubber members under the equal elastic forces from the front and rear in the axial direction so that the pulley member is elastically jointed with the hub. Thus, any thrust bearing for positioning the pulley member in the axial direction becomes unnecessary, and hence, it can be realized to reduce the number of component parts of the torque fluctuation damper pulley.

BRIEF DESCRIPTION OF THE ACCOMPANYING DRAWINGS

The foregoing and other objects and many of the attendant advantages of the present invention may readily be appreciated as the same becomes better understood by reference to the following detailed description of preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

First Embodiment

Figure 1:
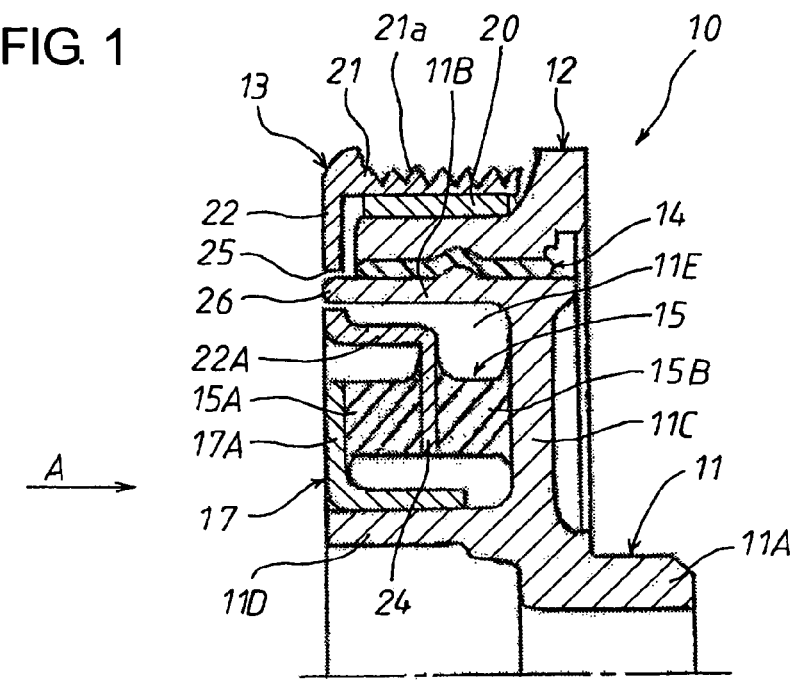
FIG. 1 is a sectional view of a torque fluctuation damper pulley in the first embodiment according to the present invention.

Hereafter, a torque fluctuation damper pulley in the first embodiment according to the present invention will be described with reference to the accompanying drawings. Referring now to FIG. 1, reference numeral 10 denotes the damper pulley, which is used to be attached to, e.g., a crankshaft (rotational shaft) of a combustion engine for a motor car with a V-belt wound therearound. The damper pulley 10 operates to drive various accessories such as, for example, alternator, water pump, and cooler compressor which are mounted on the motor car, by transmitting the driving power of the crankshaft given by the engine to the accessories through the V-belt.

The damper pulley 10 is composed of a hub 11, an inertia mass 12 and a pulley member 13 which are coaxially arranged around the circumference of the hub 11, a torsional elastic member 14 interposed between the hub 11 and the inertia mass 12, and a torque fluctuation damping elastic member 15 interposed between the hub 11 and the pulley member 13.

The hub 11 includes a cylindrical boss portion 11A, a cylindrical hub portion 11B coaxially provided around the boss portion 11A, and a connection portion 11C extending radially to connect the boss portion 11A to the hub portion 11B. Further, the hub 11 is provided with an annular or horizontal wall portion 11D which is formed bodily with the boss portion 11A to extend in parallel with the hub portion 11B. Thus, on the front surface side of the hub 11, there is formed an annular groove or channel 11E which is defined by the hub portion 11B, the connection portion 11C and the horizontal wall portion 11D.

A press fit ring 17 taking a L-letter shape in section is fixedly press-fitted on the external surface of the horizontal wall portion 11D. A vertical wall portion 17A of the press fit ring 17 is located at the opening portion of the annular channel 11E to face the connection portion 11C with a predetermined space in the axial direction. Although not shown, the internal surface of the boss portion 11A is formed to enable the shaft end of the crankshaft to be fixedly inserted thereinto, so that the hub 11 can be rotated bodily with the crankshaft.

The outer diameter of the hub portion 11B is formed to be smaller than the inside diameter of the inertia mass 12, and a ring-like torsional elastic member 14 is press-fitted with an interference fit into an annular space between the external surface of the hub portion 11B and the internal surface of the inertia mass 12. Thus, the hub 11 and the inertia mass 12 are elastically jointed with each other through the torsional elastic member 14. The torsional elastic member 14 is made of a rubber-like elastic material which is excellent in heat-resisting property as well as in mechanical strength, and the vibrations conveyed from the crankshaft can be damped by the torsional elastic member 14. A convex portion and a concave portion complementary thereto are formed respectively on the external surface of the hub portion 11B and the internal surface of the inertia mass 12 to extend in the circumferential direction, and the torsional elastic member 14 which is press-fitted under compression into the annular space between the hub 11B and the inertia mass 12 is waved in the radial direction as taken in section so that slipping in the axial and circumferential directions hardly takes place between the hub 11 and the inertia mass 12.

The pulley member (i.e., pulley rim) 13 is made of a metal material and is provided with a pulley body 21 arranged around the inertia mass 12 and is also provided with a front end portion 22. The front end portion 22 extends radially inward from the end portion on the front side of the pulley body 21 in parallel to the connection portion 11C and is bent inward the annular channel 11E to have a radially inner horizontal portion 22A extending in parallel to the hub portion 11B. The pulley body 21 has at its circumferential surface a plurality of V-grooves 21a around which a V-belt (not shown) is wound. The horizontal portion 22A of the front end portion 22 extends therefrom a support portion 24 radially inward at an intermediate position in the axial direction between the vertical wall portion 17A of the press fit ring 17 and the connection portion 11C of the hub 11. A pair of ring-like rubber members 15A and 15B which constitute a torque fluctuation damping elastic member 15 and which are the same in the thickness are interposed under compression respectively between one axial end surface of the support portion 24 and the inner end surface of the vertical wall portion 17A of the press fit ring 17 and between the other axial end surface of the support portion 24 and the inner end surface of the connection portion 11C of the hub 11. Axial end surfaces of the rubber members 15A, 15B are fixedly adhered respectively to the axial opposite end surfaces of the support portion 24, the inner end surface of the vertical wall portion 17A of the press fit ring 17 and the inner end surface of the connection portion 11C of the hub 11.

Since the support portion 24 of the pulley member 13 is disposed at an axial intermediate position between the vertical wall portion 17A of the press fit ring 17 and the connection portion 11C of the hub 11, the pulley member 13 is kept pinched or sandwiched by the pair of rubber members 15A, 15B of the same thickness under compression, with equal elastic forces being applied thereto from the front and rear in the axial direction. Thus, the pulley member 13 always has the equal forces applied thereto from the front and rear and hence, is not substantially displaced in the axial direction even without the provision of any thrust bearing for axial positioning. The pair of rubber members 15A and 15B constituting the torque fluctuation damping elastic member 15 is made of an elastic material which is excellent in heat-resisting property as well as in mechanical strength. The hub 11 and the pulley member 13 are elastically jointed with each other through the torque fluctuation damping elastic member 15. Thus, torque fluctuation of the driving torque which is input from the crankshaft to the hub 11 can be damped by the torque fluctuation damping elastic member 15 to transmit the rotation smoothly from the hub 11 to the pulley member 13.

A journal bearing 20 is interposed between the internal surface of the pulley body 21 and the external surface of the inertia mass 12, and the pulley member 13 is carried by the journal bearing 20 to be rotatable relative to the inertia mass 12 in coaxial alignment with the rotational center of the crankshaft to which the hub 13 is attached.

Figure 2:
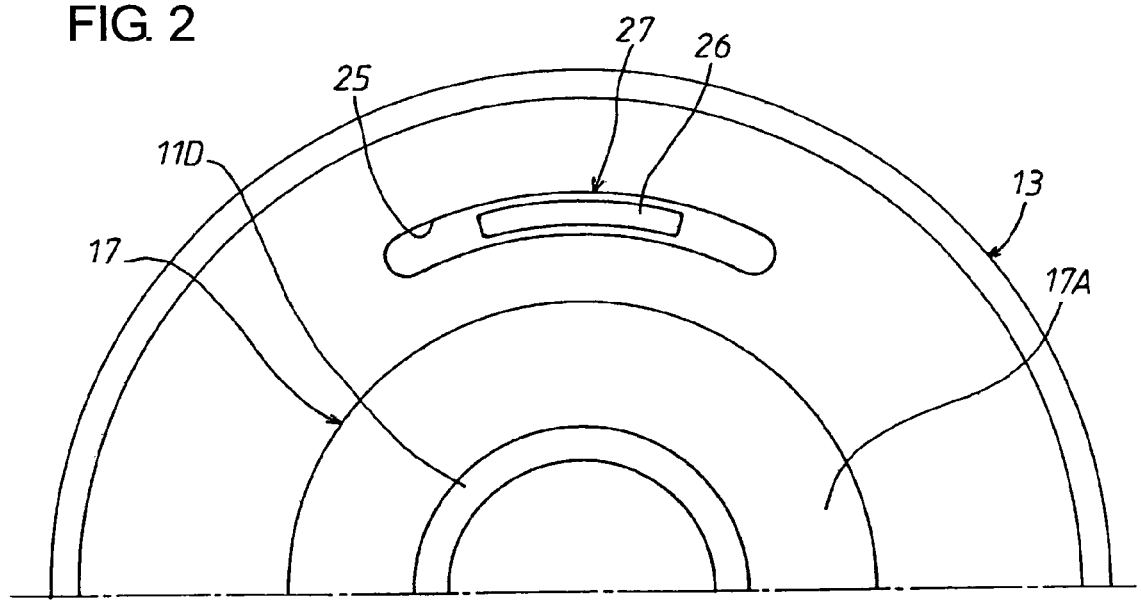
FIG. 2 is a front view of the torque fluctuation damper pulley as viewed in the direction of the arrow A in FIG. 1.

As shown in FIG. 2, a plurality (two in this particular embodiment) of arcuate engaging holes 25 are opened on the front end portion 22 of the pulley member 13 at equiangular intervals. Arcuate engaging protrusions 26 of the same number as the engaging holes 25 are protruded from an axial end of the hub portion 11B of the hub 11 and are loosely inserted respectively into the engaging holes 25 with a suitable clearance at an either side thereof in the circumferential direction. Thus, a stop mechanism 27 is constituted for restraining the relative rotation in the circumferential direction of the pulley member 13 to the hub 11 within a predetermined angular range. By the stop mechanism 27, the torque fluctuation damping elastic member 15 can be prevented from being broken as a result of being twisted excessively.

The torque fluctuation damper pulley 10 as constructed in the present embodiment is attached at the boss portion 11A of the hub 11 onto the shaft end of the crankshaft of the combustion engine (both not shown) and is thus rotated together with the crankshaft. The rotation of the crankshaft is transmitted from the hub 11 through the torque fluctuation damping elastic member 15 to the pulley member 13 and is further transmitted to the accessories such as alternator for example through the V-belt wound around the pulley member 13.

Because the engine translates the reciprocative movements of pistons into rotational movement of the crankshaft, the same generates cyclic torque fluctuation with the rotation thereof, and the cyclic torque fluctuation is damped by the torque fluctuation damping elastic member 15. Accordingly, the cyclic torque fluctuation is not transmitted to the pulley member 13, whereby smooth rotation can be transmitted from the pulley member 13 to the accessories.

In the foregoing first embodiment, since the torque fluctuation damping elastic member 15 puts the pulley member 13 between the rubber members 15A and 15B of the same thickness which have been compressed with equal forces from the front and the rear, the pulley member 13 always has equal forces being applied thereto from the front and rear. Therefore, any thrust bearing which would otherwise be used in the prior art for positioning the pulley member 13 in the axial direction becomes no longer necessary, and hence, it can be realized to reduce the number of the component parts and to enhance the durability of the torque fluctuation damping elastic member 15.

Second Embodiment

Figure 3:
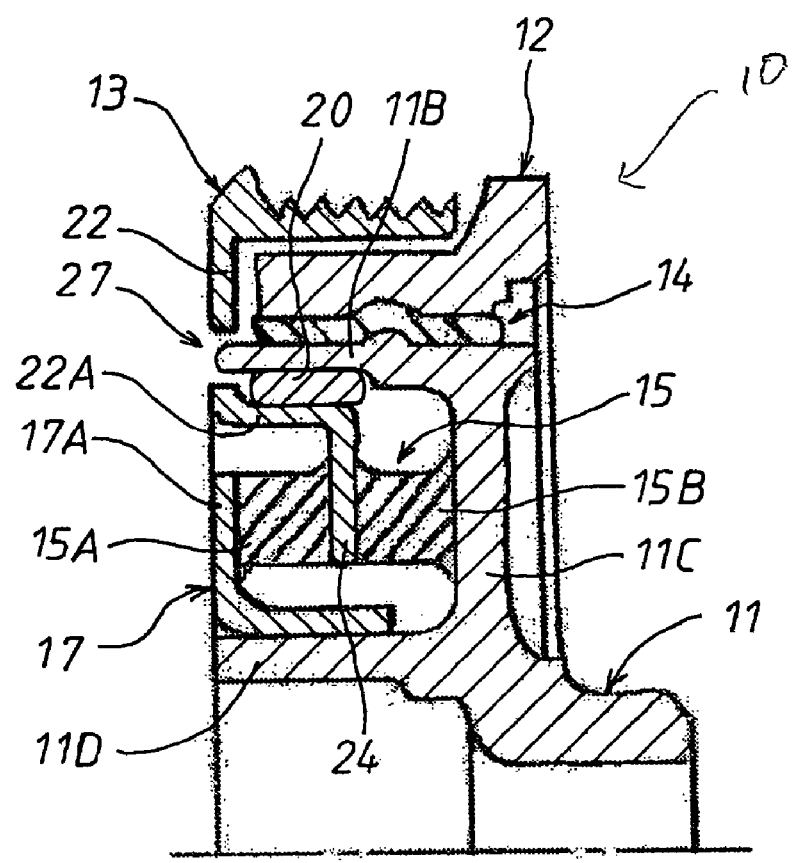
FIG. 3 is a sectional view of a torque fluctuation damper pulley in the second embodiment according to the present invention.

FIG. 3 shows a torque fluctuation damper pulley 10 in the second embodiment according to the present invention. The torque fluctuation damper pulley 10 differs from that in the foregoing first embodiment in a respect that the journal bearing 20 is interposed between the internal surface of the hub portion 11B of the hub 11 and the external surface of the horizontal portion 22A of the pulley member 13 so that the pulley member 13 can be rotationally carried by the hub 11 directly.

In the foregoing second embodiment, since the pulley member 13 is rotationally supported by the hub 11 directly, further enhancement can be attained in the coaxiality of the pulley member 13 with the rotational center of the crankshaft. Other respects of the second embodiment are the same as those in the first embodiment. Therefore, description of such other respects will be omitted as being easily understood by allocating the same reference numerals to the same component parts as those in the foregoing first embodiment.

Modifications of the Embodiments

In the foregoing embodiments, by the torque fluctuation damping elastic member 15 composed of the pair of rubber members 15A, 15B of the same thickness, the pulley member 13 is kept sandwiched between the portions 11C, 17A of the hub 11 under the equal elastic forces from the front and rear. However, the pair of rubber members 15A, 15B may not be of the same thickness in a strict sense and may be suffice to be of those capable of sandwiching the pulley member 13 with equal forces from the front and rear in the axial direction.

In the foregoing embodiments, the press fit ring 17 having the vertical wall portion 17A to take the L-letter shape in section is press-fitted on the horizontal wall portion 11D of the hub 11 in order to sandwich the pair of rubber members 15A, 15B from the front and rear in the axial direction. However, the configuration for sandwiching the rubber members 15A, 15B is not limited to that described above and may take various forms.

In the foregoing embodiments, description has been made regarding the example wherein the torsional elastic member 14 is press-fitted into the annular space between the external surface of the hub portion 11B and the internal surface of the inertia mass 12. In a modified form, other measures such as vulcanization glueing may be taken to secure the torsional elastic member 14 between the hub portion 11B and the inertia mass 12.

As described hereinabove, in the foregoing embodiments, the torque fluctuation damping elastic member 15 sandwiches the pulley member 13 between the portions 11C, 17A of the hub 11 through the pair of rubber members 15A, 15B from the front and rear in the axial direction to joint the pulley member 13 with the hub 11 elastically. Thus, any thrust bearing which would otherwise be required for positioning the pulley member 13 in the axial direction becomes unnecessary, so that it can be realized to reduce the number of component parts of the torque fluctuation damper pulley 10.

Also in the foregoing embodiments, since the pair of rubber members 15A, 15B of the torque fluctuation damping elastic member 15 are composed of those of the same thickness in the axial direction of the pulley member 13, the same can always be kept elastically under equal forces from the front and rear in the axial direction only by sandwiching the pulley member 13 between the portions 11C, 17A of the hub 11 through the rubber members 15A, 15B of the same thickness from the front and rear in the axial direction. Therefore, in addition to the reduction in number of the component parts, it can be realized to enhance the durability of the torque fluctuation damping elastic member 15.

Also in the foregoing embodiments, since the pulley member 13 is rotationally carried in radial directions by the journal bearing 20 which is interposed between itself and either one of the inertia mass 12 and the hub 11, it can be realized to support the pulley member 13 at a radial position where the rotational center of the pulley member 13 precisely coincides with that of the rotational shaft such as crankshaft, irrespective of a change in the tension force of the belt wound around the pulley member 13.

Further, in the foregoing embodiments, the support portion 24 formed on the pulley member 13 is made to extend at the intermediate position in the axial direction between the connection portion 11C and the vertical wall portion 17A provided on the hub 11, and the pair of rubber members 15A, 15B of the same thickness are securely adhered respectively between one axial end of the support portion 24 and the connection portion 11C and between the other axial end of the support portion 24 and the vertical wall portion 17A. Therefore, it can be realized in a simplified construction to elastically keep the pulley member 13 always under equal forces from the front and rear in the axial direction.

Obviously, numerous further modifications and variations of the present invention are possible in light of the above teachings. It is therefore to be understood that within the scope of the appended claims, the present invention may be practiced otherwise than as specifically described herein.

What is claimed is:

1. A torque fluctuation damper pulley comprising:
a hub adapted to be attached to a rotational shaft;
an inertia mass provided around the hub;
a torsional elastic member jointing the inertia mass with the circumferential surface of the hub;
a pulley member rotatable relative to the inertia mass and having axially front and rear surfaces, each of said axially front and rear surfaces extending radially, perpendicular to the axis of rotation of the rotational shaft; and
a torque fluctuation damping elastic member elastically jointing the pulley member with the hub and including a pair of rubber members,
wherein the pair of rubber members are fixed to the axially front and rear surfaces of the pulley member to sandwich the pulley member from the front and rear in the axial direction and apply equal and opposite elastic forces to the pulley member.

2. The torque fluctuation damper pulley as set forth in claim 1, wherein the pair of rubber members are composed of rubber members which are the same in the thickness in the axial direction.

3. The torque fluctuation damper pulley as set forth in claim 2, wherein the hub includes:
a cylindrical boss portion;
a cylindrical hub portion coaxially provided around the boss portion;
a connection portion radially extending and connecting the hub portion to the boss portion; and
a cylindrical horizontal wall portion protruding from the boss portion and extending in parallel to the hub portion,
wherein the torque fluctuation damper pulley further comprises:

a press fit ring press-fitted on the horizontal wall portion and having a vertical wall portion facing the connection portion in the axial direction; and a support portion extending radially inward from the pulley member at an intermediate position in the axial direction between the connection portion and the vertical wall portion, wherein the axially front and rear surfaces are provided on the support portion; and wherein the pair of rubber members of the same thickness are secured respectively between one of the axially front and rear surfaces of the support portion and the connection portion and between the other axial end of the axially front and rear surfaces of the support portion and the vertical wall portion.

4. The torque fluctuation damper pulley as set forth in claim 3, wherein:

the pulley member includes an end surface radially extending in parallel to the connection portion and having at least one arcuate engaging hole extending in the circumferential direction; and the hub portion protrudes at least one engaging protrusion to be inserted into the at least one arcuate engaging hole loosely with a clearance at an either side thereof in the circumferential direction.

5. The torque fluctuation damper pulley as set forth in claim 1, wherein the pulley member is rotatably carried in the radial direction by a journal bearing interposed between the pulley member and one of the inertia mass and the hub.

6. The torque fluctuation damper pulley as set forth in claim 5, wherein the hub includes:

a cylindrical boss portion;

a cylindrical hub portion coaxially provided around the boss portion;

a connection portion radially extending and connecting the hub portion to the boss portion; and a cylindrical horizontal wall portion protruding from the boss portion and extending in parallel to the hub portion, wherein the torque fluctuation damper pulley further comprises:

a press fit ring press-fitted on the horizontal wall portion and having a vertical wall portion facing the connection portion in the axial direction; and a support portion extending radially inward from the pulley member at an intermediate position in the axial direction between the connection portion and the vertical wall portion, wherein the axially front and rear surfaces are provided on the support portion; and wherein the pair of rubber members of the same thickness are secured respectively between one of the axially front and rear surfaces of the support portion and the connection portion and between the other of the axially front and rear surfaces of the support portion and the vertical wall portion.

7. The torque fluctuation damper pulley as set forth in claim 6, wherein:

the pulley member includes an end surface radially extending in parallel to the connection portion and having at least one arcuate engaging hole extending in the circumferential direction; and the hub portion protrudes at least one engaging protrusion to be inserted into the at least one arcuate engaging hole loosely with a clearance at an either side thereof in the circumferential direction.

8. A torque fluctuation damper pulley comprising:

a hub adapted to be attached to a rotational shaft;

two vertical walls provided on the hub;

an inertia mass provided around the hub;

a torsional elastic member jointing the inertia mass with the circumferential surface of the hub;

a pulley member rotatable relative to the inertia mass and disposed between the two vertical walls, the pulley member having axially front and rear surfaces, each of the axially front and rear surfaces extending radially, perpendicular to the axis of rotation of the rotational shaft; and a torque fluctuation damping elastic member elastically jointing the pulley member with the vertical walls of the hub and including a pair of rubber members, wherein the pair of rubber members sandwich the pulley member from the front and rear in the axial direction and apply equal and opposite elastic forces to the pulley member.

9. The torque fluctuation damper pulley as set forth in claim 8, wherein the pair of rubber members are composed of rubber members which are the same in the thickness in the axial direction.

10. The torque fluctuation damper pulley as set forth in claim 9, wherein the hub includes:

a cylindrical boss portion;

a cylindrical hub portion coaxially provided around the boss portion;

a connection portion radially extending and connecting the hub portion to the boss portion; and a cylindrical horizontal wall portion protruding from the boss portion and extending in parallel to the hub portion, wherein the torque fluctuation damper pulley further comprises:

a press fit ring press-fitted on the horizontal wall portion and having a vertical wall portion facing the connection portion in the axial direction; and a support portion extending radially inward from the pulley member at an intermediate position in the axial direction between the connection portion and the vertical wall portion, wherein the axially front and rear surfaces are provided on the support portion; and wherein the pair of rubber members of the same thickness are secured respectively between one of the axially front and rear surfaces of the support portion and the connection portion and between the other of the axially front and rear surfaces of the support portion and the vertical wall portion.

11. The torque fluctuation damper pulley as set forth in claim 10, wherein:

the pulley member includes an end surface radially extending in parallel to the connection portion and having at least one arcuate engaging hole extending in the circumferential direction; and the hub portion protrudes at least one engaging protrusion to be inserted into the at least one arcuate engaging hole loosely with a clearance at an either side thereof in the circumferential direction.

12. The torque fluctuation damper pulley as set forth in claim 8, wherein the pulley member is rotatably carried in the radial direction by a journal bearing interposed between the pulley member and one of the inertia mass and the hub.

13. The torque fluctuation damper pulley as set forth in claim 12, wherein the hub includes:

a cylindrical boss portion;

a cylindrical hub portion coaxially provided around the boss portion;

a connection portion radially extending and connecting the hub portion to the boss portion; and a cylindrical horizontal wall portion protruding from the boss portion and extending in parallel to the hub portion, wherein the torque fluctuation damper pulley further comprises:
   a press fit ring press-fitted on the horizontal wall portion and having a vertical wall portion facing the connection portion in the axial direction; and
   a support portion extending radially inward from the pulley member at an intermediate position in the axial direction between the connection portion and the vertical wall portion, wherein the axially front and rear surfaces are provided on the support portion; and
wherein the pair of rubber members of the same thickness are secured respectively between one of the axially front and rear surfaces of the support portion and the connection portion and between the other of the axially front and rear surfaces of the support portion and the vertical wall portion.

14. The torque fluctuation damper pulley as set forth in claim 13, wherein:
   the pulley member includes an end surface radially extending in parallel to the connection portion and having at least one arcuate engaging hole extending in the circumferential direction; and
   the hub portion protrudes at least one engaging protrusion to be inserted into the at least one arcuate engaging hole loosely with a clearance at an either side thereof in the circumferential direction.

* * * * *